(12) United States Patent
Mantilla et al.

(10) Patent No.: US 8,715,513 B2
(45) Date of Patent: May 6, 2014

(54) MODIFIED COMPACT OIL-WATER SEPARATION DEVICE AND SYSTEMS AND METHODS FOR USE THEREOF

(76) Inventors: Ivan Mantilla, Katy, TX (US); Vasudevan Sampath, Houston, TX (US); Carlos Manuel Avila, Katy, TX (US)

( * ) Notice: Subject to any disclaimer, the term of this patent is extended or adjusted under 35 U.S.C. 154(b) by 61 days.

(21) Appl. No.: 13/420,295

(22) Filed: Mar. 14, 2012

(65) Prior Publication Data
US 2013/0239816 A1 Sep. 19, 2013

(51) Int. Cl.
*B01D 21/26* (2006.01)
(52) U.S. Cl.
USPC ........................ 210/788; 210/512.1
(58) Field of Classification Search
None
See application file for complete search history.

(56) References Cited

U.S. PATENT DOCUMENTS

| | | | |
|---|---|---|---|
| 2,709,397 A * | 5/1955 | Banning | 209/730 |
| 2003/0000186 A1* | 1/2003 | West | 55/459.1 |

OTHER PUBLICATIONS

Oropeza-Vazquez, C., et al., Oil-Water Separation in a Novel Liquid-Liquid Cylindrical Cyclone (LLCC ©) Compact Separator—Experiments and Modeling, Journal of Fluids Engineering, vol. 126, Jul. 2004.*
U.S. Appl. No. 12/973,131, filed Dec. 20, 2010, Mantilla, et al.

* cited by examiner

*Primary Examiner* — Duane Smith
*Assistant Examiner* — Phillip Shao
(74) *Attorney, Agent, or Firm* — Karen R. DiDomenicis

(57) ABSTRACT

Disclosed is a compact liquid-liquid separation device useful for the separation of oil and water in hydrocarbon production operations, as well as systems and methods for use thereof. The device includes a separator body of generally vertical pipe having an upper portion and a lower portion, and an inlet to the separator body of generally horizontal pipe in fluid communication with the separator body and attached to the separator body between the upper section and the lower section. The inlet has a round cross-section portion and a reducing area nozzle portion in which the horizontal width of the inlet decreases symmetrically with proximity to the separator body. The vertical interface between the inlet and the separator body has a generally rectangular cross-section.

4 Claims, 3 Drawing Sheets

MODIFIED COMPACT OIL-WATER SEPARATION DEVICE AND SYSTEMS AND METHODS FOR USE THEREOF

BACKGROUND

The present disclosure relates to a liquid-liquid separation device useful for the separation of a higher density fluid and a lower density fluid. The device is useful for separating water and oil in hydrocarbon production operations. The present disclosure also relates to systems and methods for use of the device.

Compact separators have been developed to replace large, expensive conventional separator vessels used for separating oil, water and gas in hydrocarbon production operations. Such compact separators may be more desirable for offshore use, as they may provide a reduced footprint, and may be lighter, safer and less expensive. An example of such a compact separator is the liquid-liquid cylindrical cyclone (also referred to as the LLCC©, copyright by the University of Tulsa), which includes a vertical pipe with a horizontal inlet. The horizontal inlet includes a reducing area nozzle such that fluid enters the vertical pipe tangentially to the cross-section of the vertical pipe. The reducing area nozzle increases the fluid velocity as the fluid enters the vertical pipe, thus creating a cyclone or swirling motion of the fluids to be separated. The higher density fluid tends to flow centrifugally along the inner surface of the vertical pipe and exits through the bottom of the separator, while the lower density fluid tends to flow centrally and exits through the top of the separator.

The horizontal inlet of the LLCC© is an important component of the separator, in which stratification of the two phases in this region can be promoted to improve phase separation. The geometry of the horizontal inlet is also responsible for generating the centrifugal forces which enhance phase separation. However, in practice, it has been found that the stratified fluid phases can become mixed in the cyclone, thus negatively affecting separation of the fluids.

It would be desirable to improve the phase separation of liquid-liquid cylindrical cyclone type separators.

SUMMARY

One embodiment relates to a liquid-liquid separation device, and systems and methods for use thereof, for separating a first liquid from a second liquid wherein the density of the first liquid is lower than the density of the second liquid. The device includes a separator body comprising a section of generally vertical pipe having an upper portion and a lower portion, and an inlet to the separator body comprising a section of generally horizontal pipe in fluid communication with the section of generally vertical pipe and attached to the generally vertical pipe between the upper section and the lower section. The section of generally horizontal pipe has a round cross-section portion and a reducing area nozzle portion in which the horizontal width of the section of generally horizontal pipe decreases symmetrically with proximity to the separator body. The vertical interface between the inlet and the separator body has a generally rectangular cross-section.

DESCRIPTION OF THE DRAWINGS

These and other objects, features and advantages of the present invention will become better understood with regard to the following description, appended claims and accompanying drawings where:

DETAILED DESCRIPTION

Figure 1:
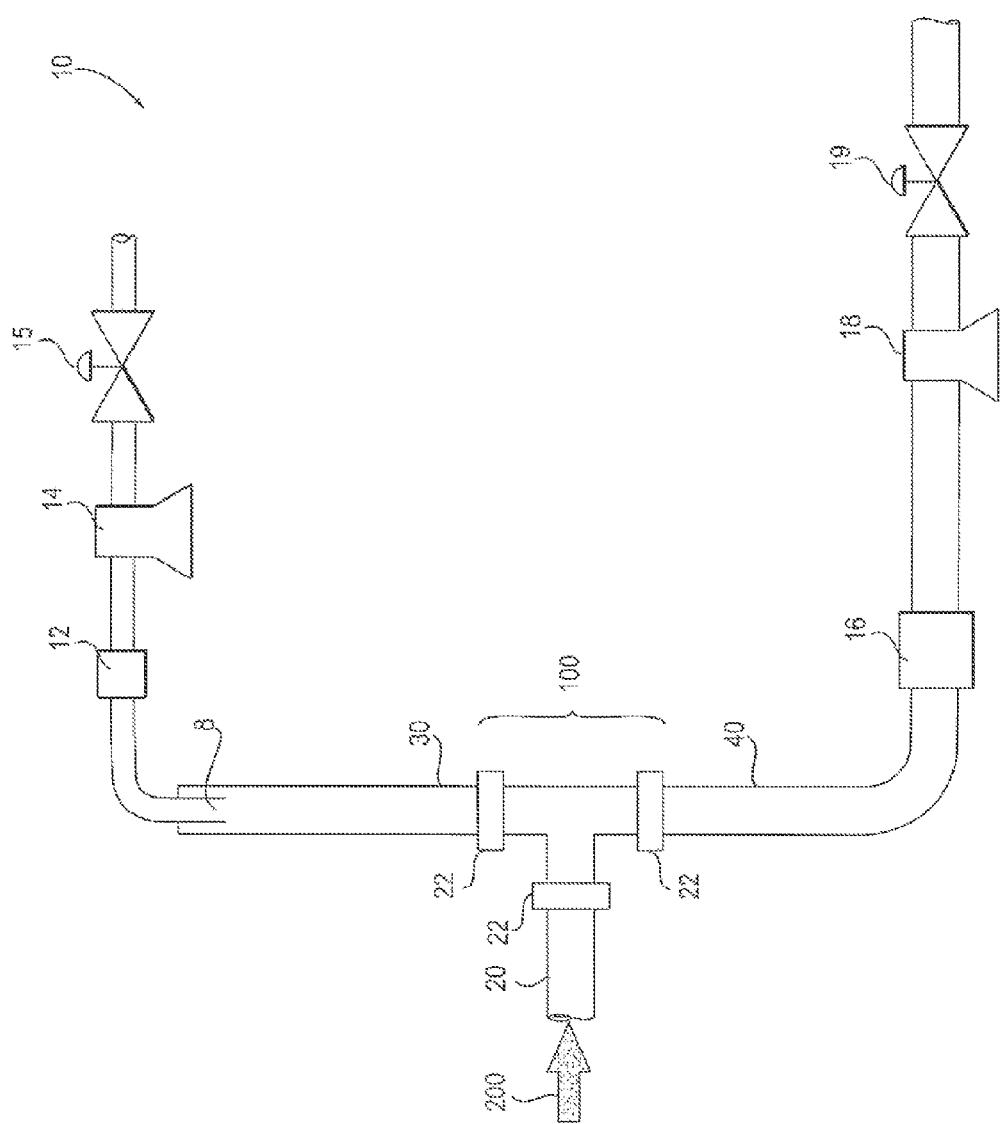
FIG. 1 is an illustration of a system including an apparatus for liquid-liquid separations.

Referring to FIG. 1, a liquid-liquid separation system 10 is illustrated in which a multi-phase fluid 200 is fed through a conduit 20 into a liquid-liquid separation device 100, connected to surrounding conduits 30 and 40 by flanges 22. The multi-phase fluid 200 can be a two phase fluid including oil and water, or it can be a three phase fluid including oil, water and small amounts of gas. The fluid 200 can be the liquid output of a gas-liquid separation device (not shown), located upstream of the liquid-liquid separation device 100. The liquid-liquid separation device 100 includes an inlet portion, an upper portion and a lower portion, to be described in further detail hereinafter. The upper portion is connected in fluid communication with an overflow conduit 30, while the lower portion is connected in fluid communication with an underflow conduit 40. In operation, the higher density phase, i.e., the water, will be directed by the separation device 100 by gravity to the underflow conduit 40, while the higher density phase, i.e., the oil, will be directed to the overflow conduit 30. The higher density phase flows through the overflow conduit 30 and the central core of the fluid flowing through conduit 30 flows through an inner section of conduit within conduit 30 also known as a vortex finder 8. The flow of the fluid in the overflow conduit 30 and in the upper portion of the separator body can be controlled by an upper control valve 15. The flow of the fluid in the underflow conduit 40 and in the lower portion of the separator body can be controlled by a lower control valve 19. The system can optionally also include sensors 12 and 16 to measure watercut directly and flow meters 14 and 18 for measuring the flow rate in the oil stream and the water stream, respectively.

Figure 2:
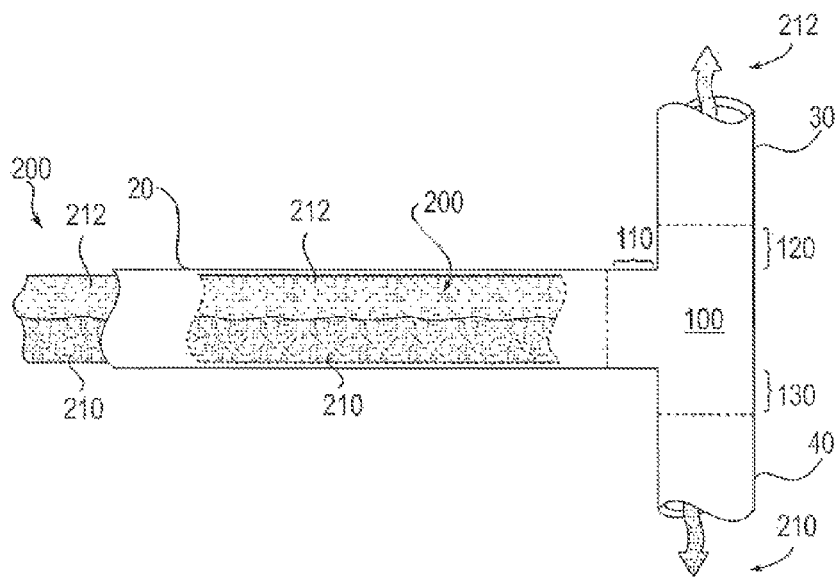
FIGS. 2-3 are illustrations of an apparatus for liquid-liquid separations according to the prior art.

As can be seen in FIG. 2, the separation device 100 includes an inlet portion 110, also referred to as the "inlet," through which the two phase fluid 200 enters the separation device 100. The separation device 100 also includes a separator body which is a section of generally vertical pipe having an upper portion 120 and a lower portion 130. The inlet 110 is a section of generally horizontal pipe in fluid communication with and attached to the separator body between the upper portion 120 and the lower portion 130. The inlet 110 has a round cross-section portion 110a and a reducing area nozzle portion 110b in which the horizontal width of the inlet 110 decreases with proximity to the separator body.

Two phase fluid 200 as it flows through the conduit 20 can be seen in FIG. 2. The oil and water phases are stratified, such that the oil layer 212 is distinguishable from the water layer 210. Some mixing may be present, with water droplets within the oil layer 212 and oil droplets within the water layer 210.

Figure 3:
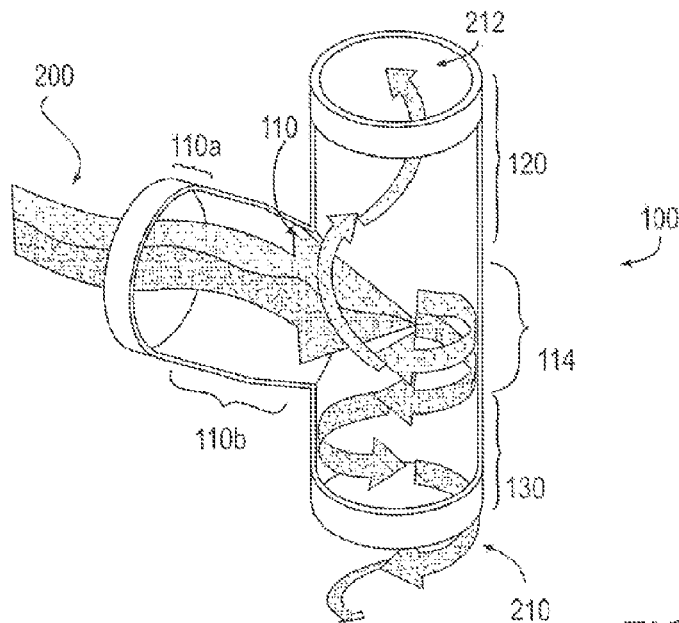

FIG. 3 is a cutaway perspective view of a liquid-liquid separation device 100 according to the prior art illustrating the separation of the oil and water phases within the device. As the two phase fluid 200 flows through the reducing area nozzle portion 110b, the velocity of the fluid is increased and the fluid is directed to the circumference of the separator body 110. The two phase fluid 200 is caused to swirl such that a cyclone forms within the separator body in the region represented by 114. In this cyclone region, the higher density phase liquid 210 flows along the wall of the separator body and downward through the lower portion 130, assisted by gravity, while the lower density phase liquid 212 flows upward through the upper portion 120. In this way, the two phase fluid is separated into a predominantly first liquid phase 212 in the upper portion of the separator body and a predominantly second liquid phase 210 in the lower portion of the separator body.

Figures 4A, 4B, 4C, 4D:
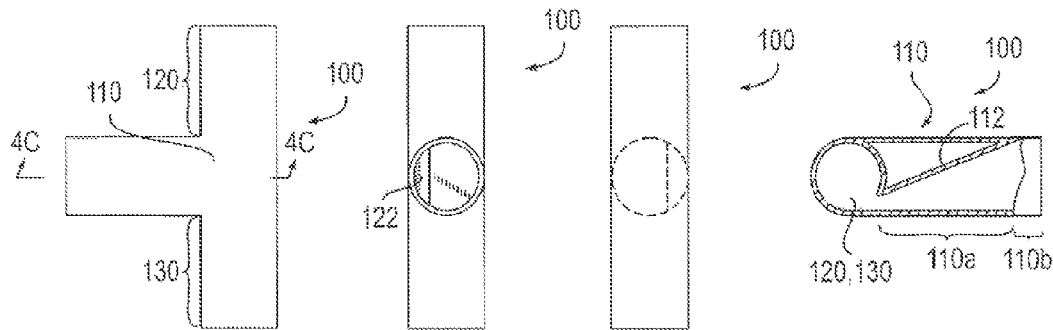
FIGS. 4A-4D are views of an apparatus for liquid-liquid separations according to the prior art.

FIGS. 4A-4D are views of a liquid-liquid separation device 100, as generally described above, according to the prior art. The inlet 110 to the separator body transitions from a round cross-section portion 110a through a reducing area nozzle portion 110b in which the horizontal width of the inlet 110 decreases with proximity to the separator body. As can be seen from the top view of the separation device 100 shown in FIG. 4D, in the reducing area nozzle portion 110b, a single sloping wall or plate 112 within the inlet causes a reduction of cross-sectional area in the inlet, causing the fluid flowing therethrough to accelerate. In the known device as shown, the single sloping wall or plate 112 results in a decrease in the horizontal width of the inlet 110 with proximity to the separator body, i.e., as the inlet transitions from the round cross-section portion 110a to the separator body. As a result of the horizontal width of the inlet 110 decreasing only from one side, i.e., the right side as shown in front view FIG. 4B, a vertical interface or opening 122 between the inlet and the separator body, when viewed down the length of the inlet, is provided which generally has a circular segment shape. A circular segment is defined as the area of a circle defined by a chord intersecting an arc, not including the center of the circle. FIG. 4A is a side view of the separation device 100 viewed from a perspective 90° from that of FIG. 4B. FIG. 4C is a rear view of the separation device 100 from a perspective 180° from that of FIG. 4B.

Figures 5A, 5B, 5C, 5D:
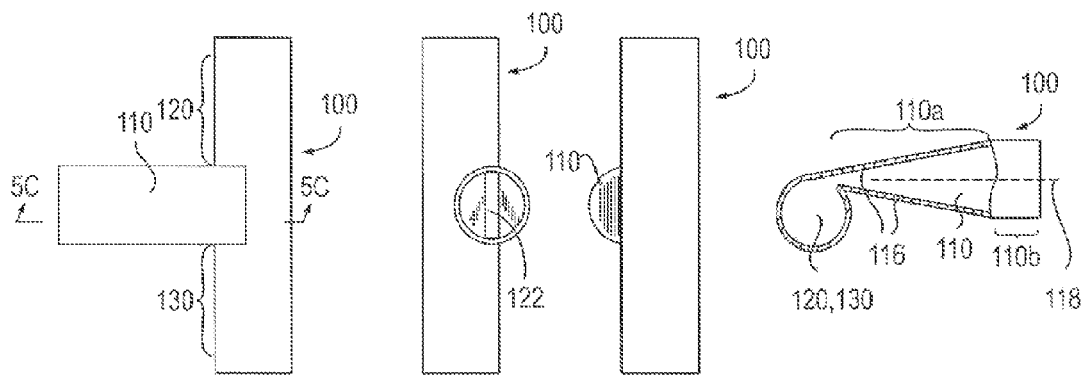
FIGS. 5A-5D are views of an apparatus for liquid-liquid separations according to one inventive embodiment.

FIGS. 5A-5D are views of a liquid-liquid separation device 100 according to one inventive embodiment of the present disclosure. The inventive liquid-liquid separation device 100 differs from the prior art separation device described above and shown in FIGS. 4A-D in the design of the inlet 110. As can be seen from the top view FIG. 5D, in the reducing area nozzle portion 110b, the walls of the inlet 116 narrow symmetrically about centerline 118 such that the horizontal width of the inlet 110 decreases symmetrically with proximity to the separator body. Furthermore, the inlet is offset from the separator body such that the centerline 118 of the inlet is generally tangential to the cross-section of the separator body (120, 130). As a result of the horizontal width of the inlet 110 decreasing symmetrically from both sides, i.e., the left and right sides as shown in front view FIG. 5B, the vertical interface or opening 122 between the inlet and the separator body, when viewed down the length of the inlet, has a generally rectangular shape. The rectangular opening 122 is adjacent the inner wall of the separator body, so that fluids entering the separator body through the inlet will enter the separator along the wall to generate maximum tangential velocity or centrifugal force. The rectangular opening 122 can have a cross-sectional area from about 15% to about 25% of the total cross-sectional area of the round cross-section portion 110a of the inlet 110. FIG. 5A is a side view of the separation device 100 viewed from a perspective 90° from that of FIG. 5B. FIG. 5C is a rear view of the separation device 100 from a perspective 180° from that of FIG. 5B.

EXAMPLES

An inventive liquid-liquid separation device 100 (Example 1) as illustrated in FIGS. 5A-D and a prior art liquid-liquid separation device 100 (Comparative Example) as illustrated in FIGS. 4A-D were tested in a system as illustrated in FIG. 1.

The two phase fluid feed 200 contained Exxsol™ D130 dearomatized hydrocarbon fluid, available from ExxonMobil Chemical Company (Houston, Tex.) and tap water. The separation device 100 had an inlet 2 inch (5.1 cm) in length and diameter, and 5 ft (1.52 m) in height. The feed 200 had a watercut (WC) of 66-67% (as indicated in Table 1), a velocity of 0.47 m/s, and a flow rate of 15 gpm (57 l/m). Split ratio, i.e., the ratio of underflow flow rate to inlet flow rate, was varied as in Table 1. The uncertainty in the WC measurements was within 3.5%.

The results in Table 1 indicate improved oil-water separation performance of the inventive liquid-liquid separation device when compared with a conventional LLCC® separator. The improved performance was demonstrated by a resulting water stream with lower oil content and a resulting oil stream with lower water content over a range of split ratios.

TABLE 1

|  | Split ratio % | Inlet WC % | Underflow WC % | Overflow WC % |
|---|---|---|---|---|
| Example 1 (liquid-liquid separation device with rectangular tangential inlet) | 30.1 | 66.6 | 100.0 | 34.3 |
|  | 39.8 | 66.6 | 100.0 | 32.4 |
|  | 50.8 | 66.7 | 100.0 | 34.2 |
|  | 55.1 | 66.7 | 96.5 | 46.1 |
|  | 59.7 | 66.4 | 90.2 | 53.3 |
| Comparative Example (conventional LLCC ® separator with tangential inlet) | 29.4 | 66.7 | 100.4 | 54.9 |
|  | 40.0 | 66.7 | 100.4 | 46.8 |
|  | 49.8 | 66.5 | 98.1 | 38.7 |
|  | 59.6 | 66.6 | 84.6 | 43.2 |

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A liquid-liquid separation device for separating a first liquid from a second liquid wherein the density of the first liquid is lower than the density of the second liquid, the device comprising:

a separator body comprising a section of generally vertical pipe having an upper portion and a lower portion; and an inlet to the separator body comprising a section of generally horizontal pipe in fluid communication with the section of generally vertical pipe and attached to the generally vertical pipe between the upper section and the lower section, the section of generally horizontal pipe having a round cross-section portion and a reducing area nozzle portion in which the horizontal width of the section of generally horizontal pipe decreases symmetrically about a horizontal centerline of the section of generally horizontal pipe with proximity to the separator body;

wherein a vertical interface between the inlet and the separator body has a generally rectangular cross-section and is adjacent an inner wall of the separator body.

2. The liquid-liquid separation device of claim 1, wherein the vertical interface between the inlet and the separator body has a cross-sectional area from about 15% to about 25% of the cross-sectional area of the round cross-section portion of the generally horizontal pipe.

3. The liquid-liquid separation device of claim 1, further comprising an upper control valve for controlling flow of fluids in the upper portion of the separator body and a lower control valve for controlling flow of fluids in the lower portion of the separator body.

4. A method for separating a first liquid from a second liquid wherein the density of the first liquid is lower than the density of the second liquid, the method comprising:

feeding a two phase fluid comprising the first liquid and the second liquid to the liquid-liquid separation device of claim 1 through the inlet whereupon the two phase fluid is separated into a predominantly first liquid phase in the upper portion of the separator body and a predominantly second liquid phase in the lower portion of the separator body.

* * * * *